United States Patent [19]

Kreusel

[11] Patent Number: 4,907,907
[45] Date of Patent: Mar. 13, 1990

[54] LINKING DEVICE FOR A PIPE TO A STRUCTURAL COMPONENT

[76] Inventor: Ulrich Kreusel, Birkenstrasse 28, 6537 Gensingen, Fed. Rep. of Germany

[21] Appl. No.: 87,190

[22] Filed: Aug. 20, 1987

[30] Foreign Application Priority Data

Aug. 20, 1986 [DE] Fed. Rep. of Germany ....... 3628269
Jun. 26, 1987 [DE] Fed. Rep. of Germany ....... 3721092

[51] Int. Cl.⁴ .............................................. F16B 11/00
[52] U.S. Cl. .................................... 403/171; 403/176; 403/298; 403/312
[58] Field of Search ............... 403/171, 176, 170, 173, 403/174, 178, 191, 190, 195, 187, 217, 218, 263, 298, 300, 373, 292, 305, 306, 312, 310

[56] References Cited

U.S. PATENT DOCUMENTS

| | | | |
|---|---|---|---|
| 3,356,394 | 12/1967 | Chamayoru | 403/171 |
| 4,017,199 | 4/1977 | Strassle | 403/190 X |
| 4,403,767 | 9/1983 | Basey | 403/292 X |
| 4,461,596 | 7/1984 | Davidson | 403/187 X |
| 4,626,123 | 12/1986 | Brown | 403/171 X |
| 4,669,908 | 6/1987 | Simone et al. | 403/170 |
| 4,679,961 | 7/1987 | Stewart | 403/176 X |

FOREIGN PATENT DOCUMENTS 768890 2/1954 United Kingdom ................ 403/218

Primary Examiner—Randolph A. Reese
Assistant Examiner—Peter M. Cuomo
Attorney, Agent, or Firm—Spencer & Frank

[57] ABSTRACT

The invention relates to a linking device for connecting the front end of a pipe to a structural component, particularly to a sphere to form a junction point with a plurality of pipe connections. The subject of the invention is distinguished in that the pipe (2) has an axially extending longitudinal channel (7) into which is inserted from the front a securing element (4) which is connected via a clamping device (6), abutting with its ends on the pipe (2) and on a structural component (3) and consisting of two opposed clamping jaws (19, 20) held together by a screw connection (39), with a connecting element (5) fixed opposite from the securing element (4) on the structural component (3).

20 Claims, 14 Drawing Sheets

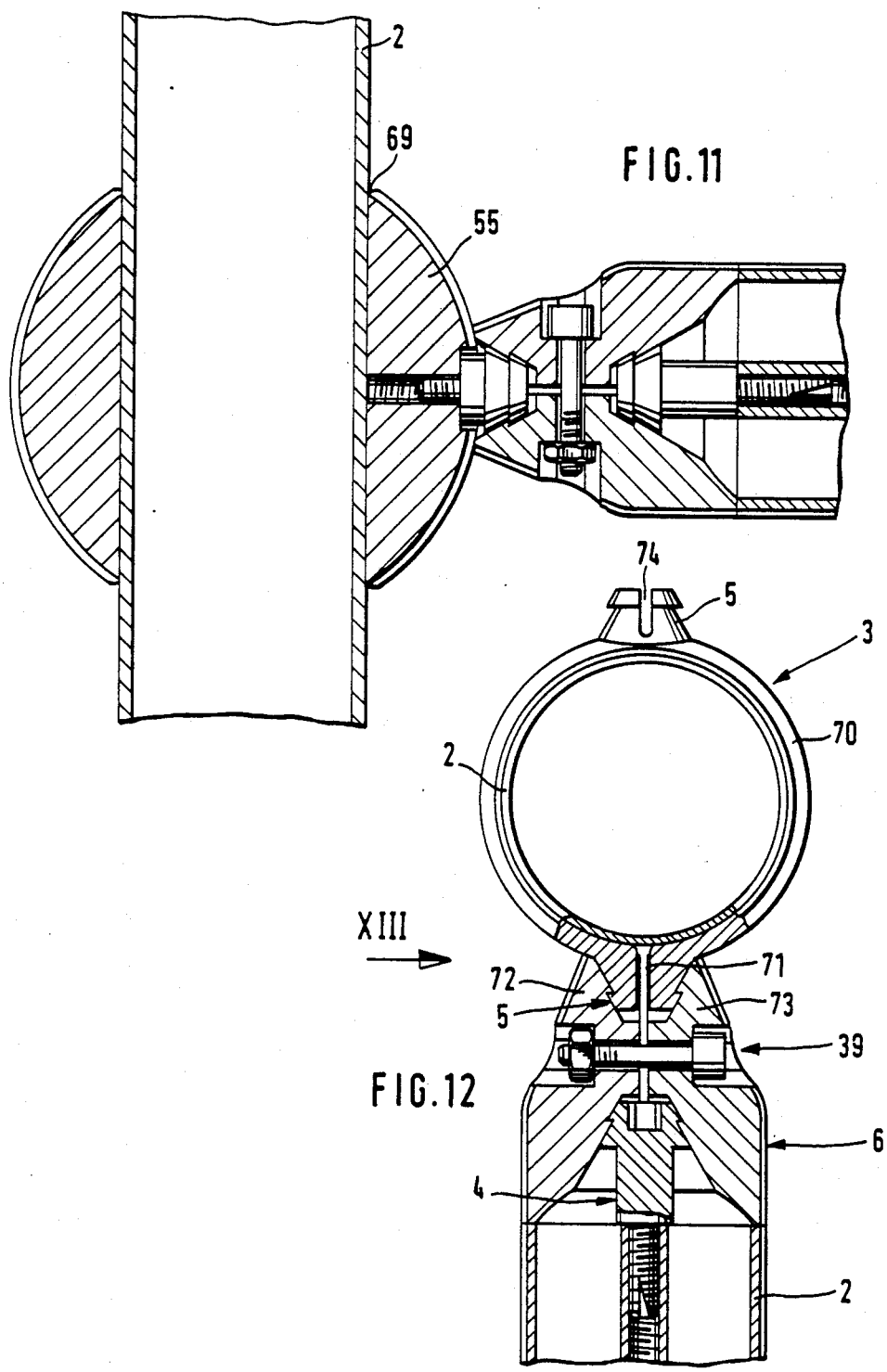

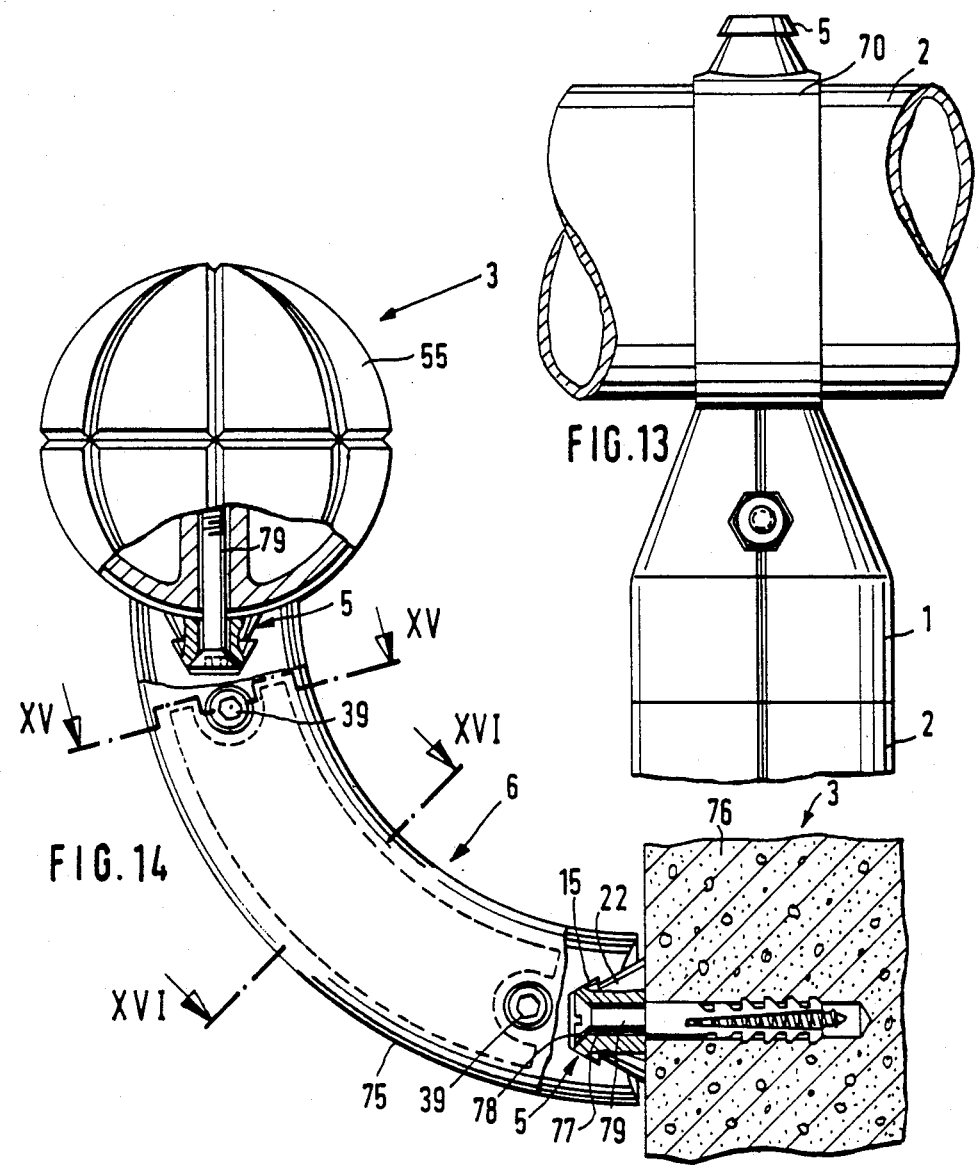
FIG.13
FIG.14
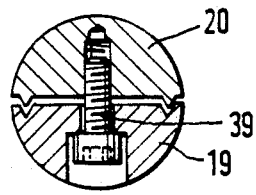
FIG.15
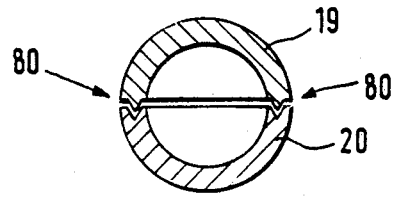
FIG.16

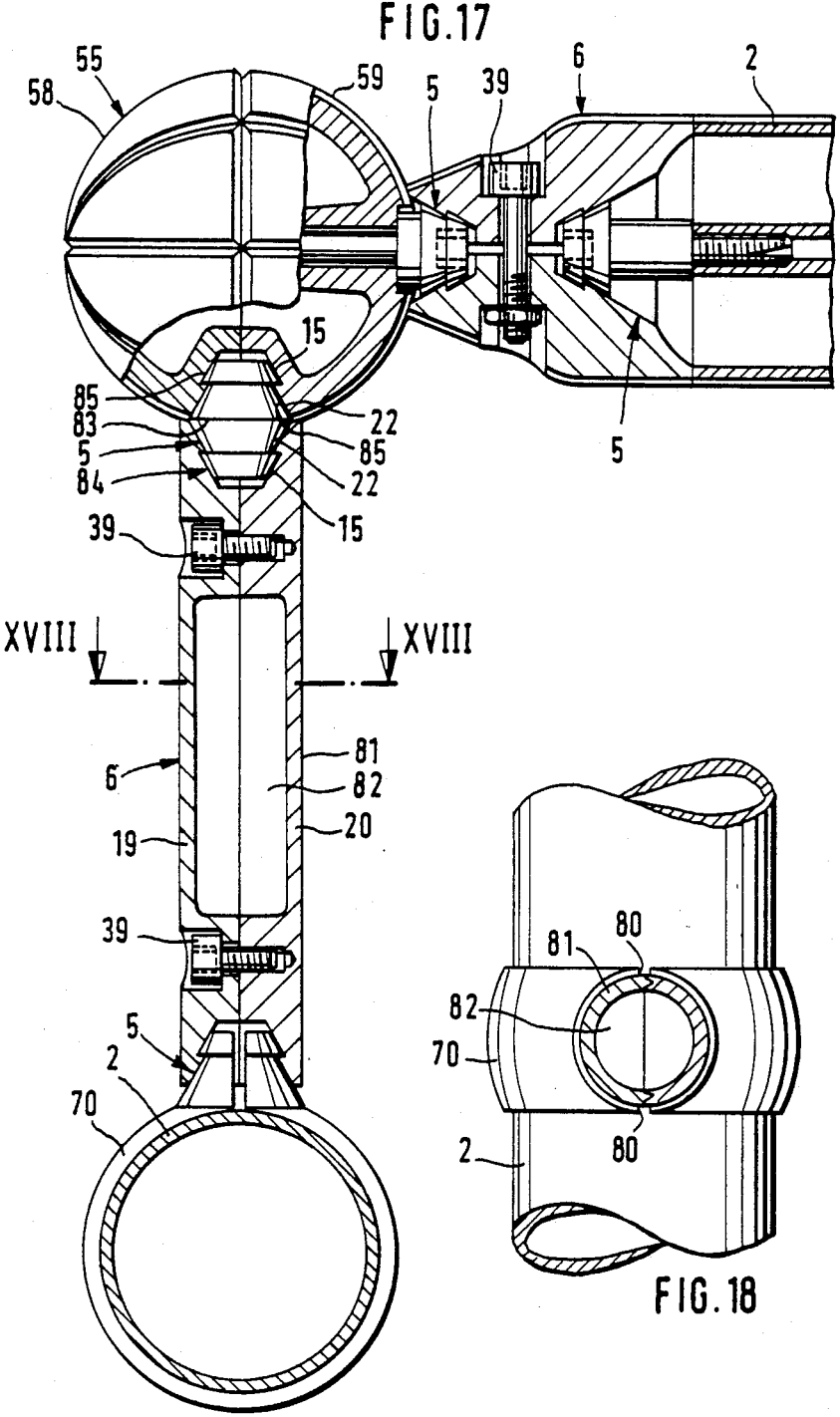
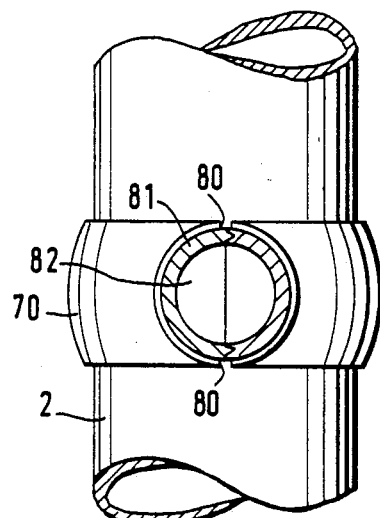

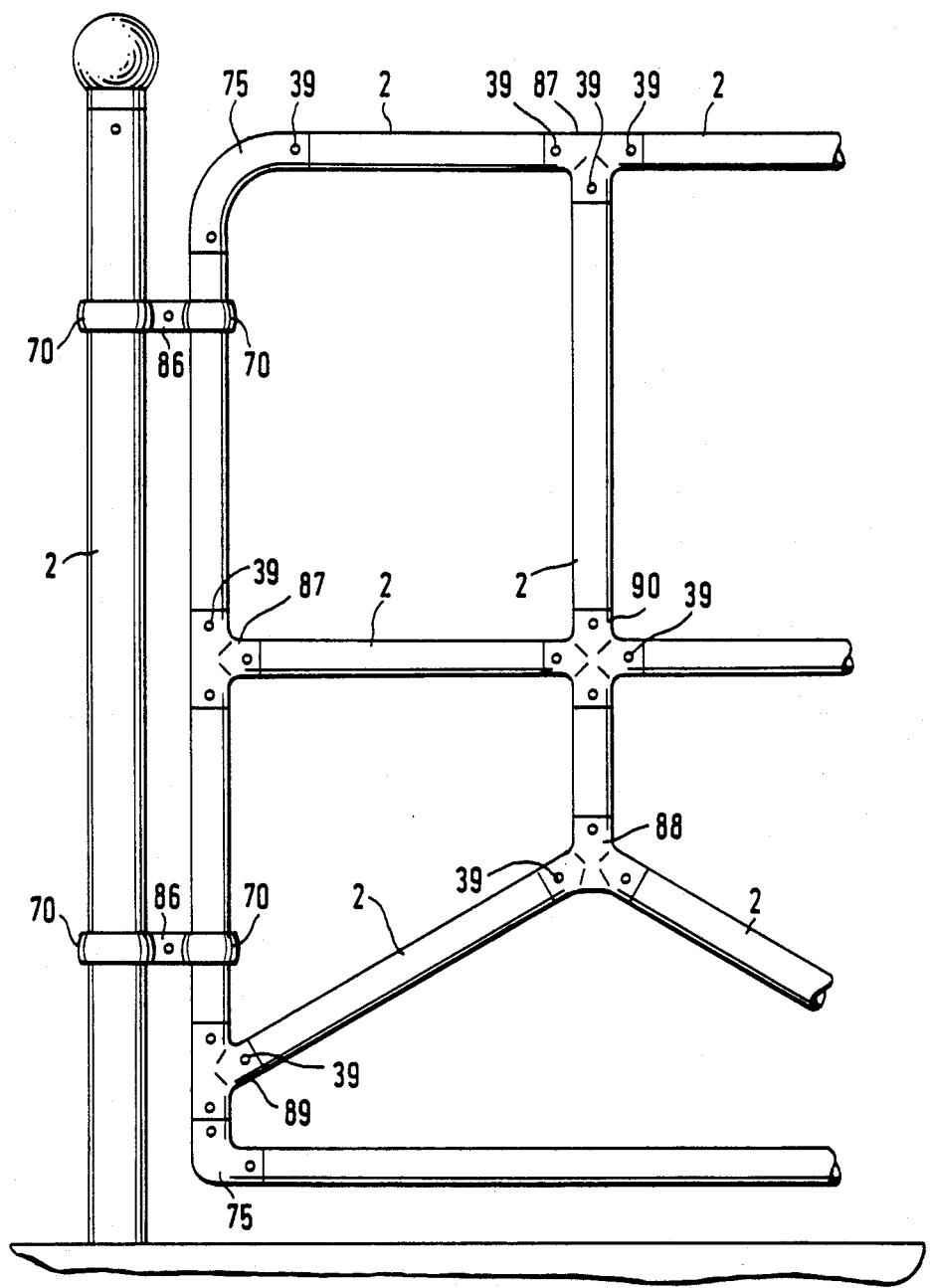

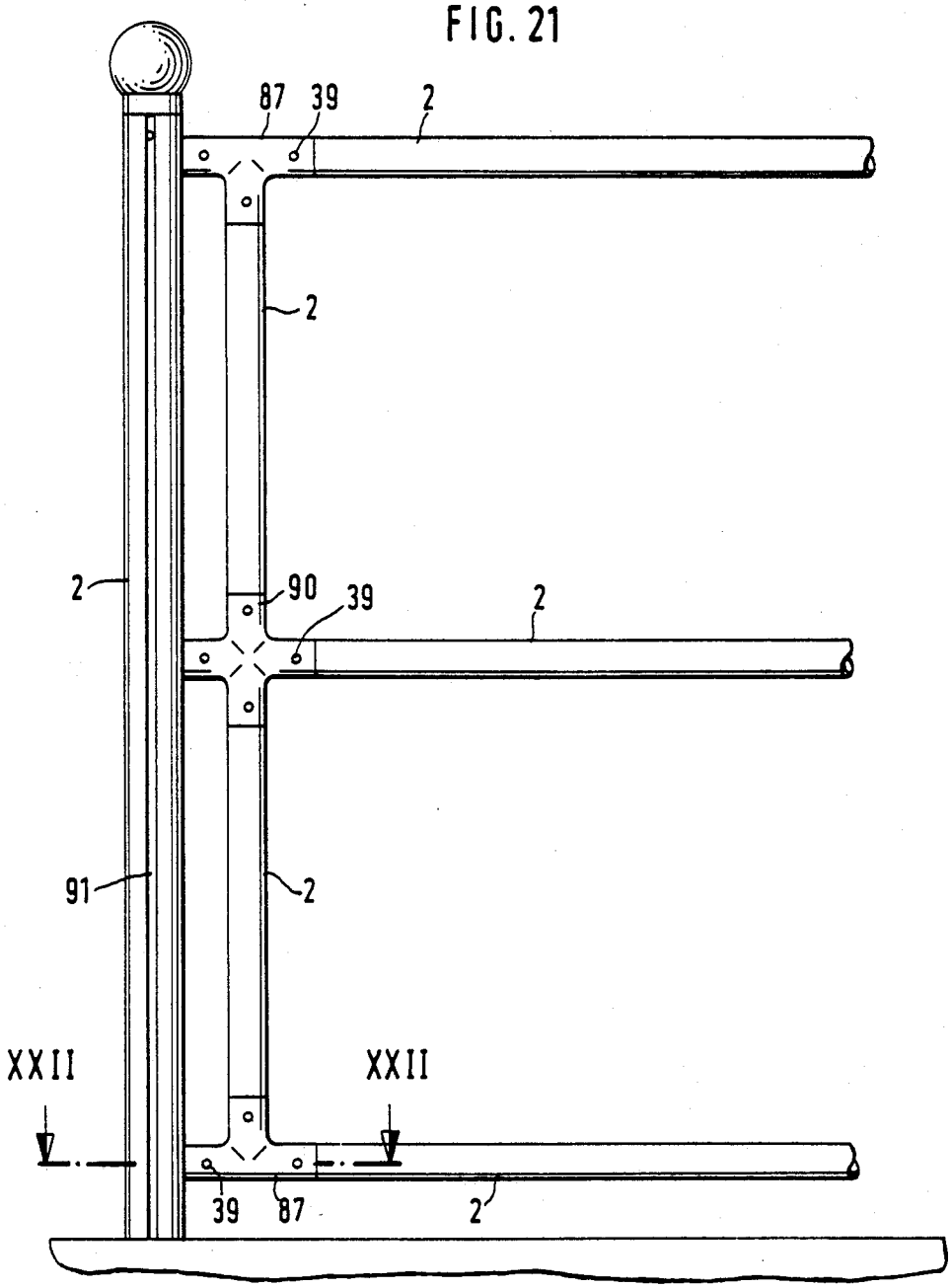

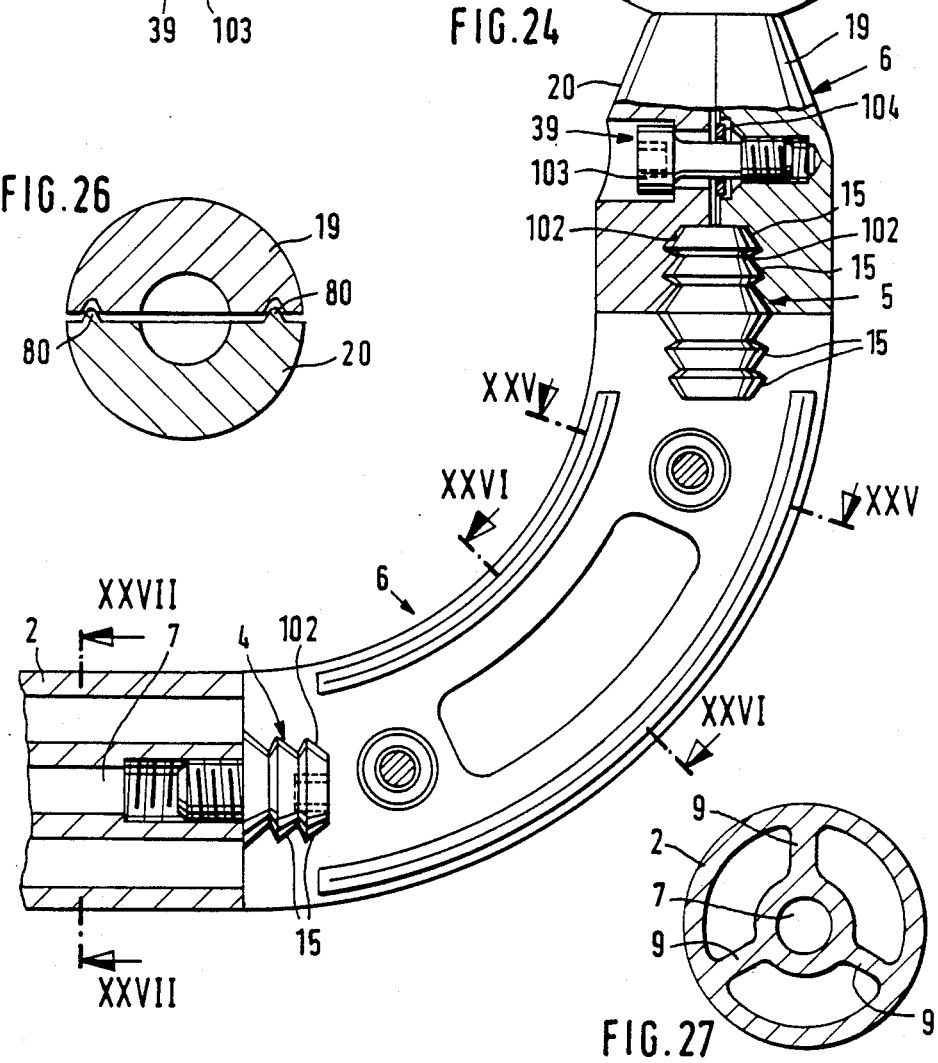

ically, 4,907,907

LINKING DEVICE FOR A PIPE TO A STRUCTURAL COMPONENT

BACKGROUND OF THE INVENTION

The invention relates to a linking device for connecting the front end of a pipe to a structural component, particularly to a sphere to form a junction point with a plurality of pipe connections.

Normally pipes are connected with their front end to a structural component by means of soldering or welding these parts together, using different methods depending on the materials employed. Also connecting means can be applied on the exterior of the pipe and the structural component and the fastening of the parts to each other can be performed with the aid of screws, rivets or threads cut into them. It is furthermore possible to provide threads inside the pipe and the structural component and to attach there corresponding interfacing parts which can be screwed in. Finally it is possible to insert coupling members on the inside of the pipe and the structural component in the form of tension rods, for example with the aid of screws. These known connecting possibilities very often result in making the once connected parts hard to separate because the connections are either inherently impossible to disconnect or because a binding of both parts takes place during making the connection.

SUMMARY OF THE INVENTION

It is an object of the invention to provide a linking element of the type previously described which makes possible a quick connection between the pipe and the structural component while at the same time secure fastening and quick release of the connection is guaranteed.

This object is attained by the invention by the pipe having an axial, longitudinally extending channel into which a securing element is inserted from the front which is connected with a connecting element located on the structural component opposite from the securing element via a clamping device attached with its ends to the pipe and the structural component and consisting of two clamping jaws lying opposite of each other and connected by a screw connection.

By means of the construction of the linking device according to the invention it is possible to achieve a quick frontal connection of a pipe with a structural component in a simple way, which can be released just as quickly. After insertion of the securing element into the frontal opening of the axial channel of the pipe and fastening of the securing element on the structural component, the securing element and the connecting element must be aligned in the same plane and then it is merely required to insert the connecting element and the securing element into the loosened clamping device and then to tightly secure the screw connection of the clamping jaws of the clamping device, then the pipe is securely attached in relation to the structural component. Quick release of the connection between the pipe and the structural component is possible after loosening the screw connection by removing the clamping device from the securing element and the connecting element.

In an advantageous embodiment of the invention it is preferably provided that both the free ends of the securing element and the connecting element are equipped with a circumferential locking projection, that each locking projection engages a correspondingly formed circumferential groove in the opposite insides of the clamping jaws of the clamping device, and that the clamping jaws of the clamping device can be locked together with the securing element and the connecting element by means of the screw connection. Because of the construction of the locking projection and of the associated grooves with a circular cross section, the possibility is created in the untightened state to turn the pipe and the structural component in relation to each other.

In accordance with an improvement of the subject of the invention, the locking projections have a truncated cone-like cross section and are provided at their wide side with an undercut which engages a corresponding step of the associated circumferential groove in the clamping jaws of the clamping device. By means of this, the connecting process is made easier and the clamping surface increased.

For a further increase of the clamping surface as well as to further simplify the connecting process, the truncated cone-like locking projections of the securing element and the connecting element transition, according to the invention and while forming the undercut, on each of their wide sides into a similarly formed plug zone, a plug-in opening, correspondingly shaped like a truncated cone in cross section and extending as far as the corresponding groove, being cut into the insides of the clamping jaws of the clamping device. The undercut of each locking projection extends at an angle to the adjacent plug zone in order to achieve a compensation for tolerances.

For the purpose of a simple connection between the securing element and the pipe, the plug zone of the securing element preferably transitions axially into a pin extending into the connecting plane of the clamping device, to which is joined at the front end and while forming an annular shoulder a threaded pin extending into the channel of the pipe and being supplied with a self-tapping thread. In a practical manner a hexagonal blind bore for receiving an Allen key is cut into the front face of the locking projection of the securing element. The plug-in opening of the clamping device receiving the securing element has, beginning at its connecting plane with the pipe, a cup-shaped indentation for the connection, if desired, of a sphere instead of a pipe at this side of the clamping device.

It is furthermore preferably provided that the plug zone of the connecting element transitions axially, and while forming an annular shoulder, into a threaded pin which engages an associated threaded bore of the structural component, and that the front face of the locking projection of the connecting element has a hexagonal blind bore. By means of this a simple and secure connection between the connecting element and the structural component can be achieved. To increase the force transfer surface, the annular shoulder of the plug zone of the connecting element is usefully adapted to the contours of the surface of the structural component.

To make possible a disposition of the clamping device in an as space-saving as possible manner, the clamping device includes, in accordance with a further advantageous embodiment of the invention, a cylindrical area, the front face of which abuts on the front face of the wall of the pipe, and a conical area, the front face of which abuts on the structural component while being adapted to the contours of the surface of the structural component. In a practical manner the screw connection of the two clamping jaws, which extends through the conical area of the clamping device, comprises an Allen screw with associated nut. By means of a corresponding shaping of the opening of the clamping jaw, the nut of the screw connection is preferably inserted in this opening secured against turning.

In order to keep the two clamping jaws at a certain distance from each other in the opened state of the clamping device and thus to ease the plug-in operation of the securing element and the connecting element into the clamping device, respectively opposite blind bores are cut equidistant from the longitudinal axis into the inside of the clamping jaws in the cylindrical area of the clamping device in accordance with an advantageous development of the invention, a compression spring being inserted into each of the two aligned blind bores.

To achieve a suitable manufacture of the pipe, in a development of the invention the channel extending in the center of the pipe has a continuous longitudinal slit and is held in place by means of three crosspieces disposed offset from each other by 120°. Preferably the pipe is provided on its surface with longitudinal grooves, triangular in cross section and extending at an angle of 45° to each other, the wall of the pipe having a reinforcement in the area of each longitudinal groove. A threaded bore can be disposed at a random location in these longitudinal bores for receiving a connecting element, the connecting element to be connected via a clamping device with an additional pipe. In this way a plurality of branch pipes can be simply provided from a single pipe.

To ease the formation of a pipe junction, in accordance with a preferred embodiment of the invention the sphere serving as structural component is provided on its surface with longitudinal grooves, triangular in cross section and extending at an angle of 45° to each other meridian-like, and with a lateral groove, also triangular in cross section and extending axially to the longitudinal grooves, it being possible to insert a plurality of connecting elements, which are each connected with a pipe via a clamping device and a securing element, into threaded bores provided in the length of the grooves.

For the purpose of a simple construction of the sphere, in further development of the subject of the invention the sphere is hollow and is put together from two halves of the sphere connected with a screw, their line of separation extending through the center of the lateral groove of the sphere, the head of the screw being provided as connecting element. Alternatively, the sphere can also be made of solid material and have a center bore for receiving a continuous pipe. Such an embodiment is practical for the formation of frame girders.

In a further embodiment of the invention it is alternately provided to embody the structural component in the form of a pipe bracket surrounding a continuous pipe, the clamping shanks of which are made as connecting elements and can be locked via the screw connection of the clamping device. By means of this embodiment a quick connection can be made with the front of a continuous pipe. In a practical manner the pipe bracket has on its circumference a plurality of connecting members evenly distributed, by means of which a plurality of pipes can be connected with their front ends to a continuous pipe.

In order to make connections of different types, the clamping device is disposed, in accordance with a further development of the invention, as a 90° pipe elbow with two screw connections, as a straight pipe section with two screw connections, as a straight rod with two screw connections, as a T-type pipe section with three screw connections, as a Y-type pipe section with three screw connections or as an angled branch pipe section with three screw connections. In a practical manner the clamping jaws of the clamping devices in the form of a 90° pipe elbow, T-type pipe section, Y-type pipe section or angled branch pipe section are fixed in their positions to each other via corresponding groove and tongue guides.

In an alternate embodiment of the invention the connecting element consisting of locking projection and plug zone is preferably provided with an axial through-bore which is widened in the area of the locking projection to receive a screw head, the connecting element being fixed on a structural component via a screw correspondingly fed through the through-bore. A further alternate form of the connecting elements is distinguished in that the connecting element is in the form of a body, mirror-symmetrical in respect to its cross axis, having locking projections externally and plug zones internally, with which are associated correspondingly shaped elements in the clamping device and the structural component.

To achieve a connection to the pipe at any height, in a further development of the invention the pipe is provided on its outside with swallowtail-shaped longitudinal grooves distributed evenly over its circumference, into which corresponding tenon blocks with a threaded bore can be slidingly inserted, it being possible to fix each tenon block in its desired position by means of a screw acting through the threaded bore and being part of a connecting element. In a practical manner the swallowtail-shaped longitudinal grooves of the pipes are filled with blind bars inserted from the front into the areas not used for the tenon blocks. An alternate version of this consists in that the pipe is provided on its outside with longitudinal grooves evenly distributed over the circumference and extending conically towards the outside, each bottom of which has a small axial longitudinal slit, and in that after a threaded bore has been provided in the area of the longitudinal slit of a longitudinal groove at a random location, the threaded pin of a corresponding connecting element, which is provided with an attachment, can be screwed in.

To improve the transfer of force, the connecting element or securing element is preferably provided with several locking projections located above one another, with which are associated correspondingly shaped elements in the clamping jaws of the clamping device. Additionally for improving the transfer of force the sphere serving as structural component is preferably comprised of solid material and provided on the outside with threaded bores evenly distributed over the surface for fixing of connecting elements, the threaded bores not being occupied by connecting elements being closed by blind plugs. The threaded bores of the sphere preferably transition into a non-threaded conical widening for receiving a corresponding attachment of the connecting element.

To easily fix the pipe frontally on the floor, in accordance with a further development of the subject of the invention the pipe is fastened via a screw, attached to a tenon block and screwed into the channel of the pipe, to a longitudinal hollow section having a swallowtail-shaped longitudinal groove receiving the tenon block, a through-bore being disposed in the bottom of the longitudinal groove at any desired location. Alternately to this, a connecting element is disposed at the end of the pipe, in the bottom of which a correspondingly shaped recess for receiving the connecting element has been formed, the connecting element being provided with a T-shaped foot which is clamped into a hollow section abutting frontally on the connecting element. A further alternate consists in that the clamping device supporting on its one end the pipe is connected at its other end via the connecting element to a plate having a swallowtail-shaped groove with a tenon block inserted therein, which is fixed via a screw connection with the connecting element.

To achieve a light and weather-proof connecting element in accordance with the invention, all structural components are made of aluminum.

BRIEF DESCRIPTION OF THE DRAWINGS

The idea which forms the basis of the invention is further explained in the following description by means of several exemplary embodiments shown in the drawings.

Shown are in:

FIG. 11 an enlargement of the detail "B" of FIG. 10 in section, however without the axial channel of the pipe.

FIG. 12 a section through the linking device in accordance with the invention, for the frontal connection of a pipe to a pipe bracket surrounding a pipe.

FIG. 13 a view of the section according to FIG. 12 in the direction of the arrow XIII.

FIG. 14 a view of a linking device between a sphere and a wall, partially in section, with a clamping device in the form of a 90° pipe elbow.

FIG. 15 a section along the line XV—XV through the linking device according to FIG. 14.

FIG. 16 a section along the line XVI—XVI through the linking device according to FIG. 14.

FIG. 17 a view of the frontal and lateral connection of a pipe to a sphere with the aid of the linking elements according to the invention.

FIG. 18 a section through the view according to FIG. 17 along the line XVIII—XVIII.

FIG. 20 a section of a pipe grid constructed with the aid of different clamping devices of the linking elements.

FIG. 21 an alternate embodiment of the pipe grid according to FIG. 20.

FIG. 24 an alternate view of the 90° connection between a sphere and a pipe.

FIG. 25 a section through the linking device according to FIG. 24 along the line XXV—XXV.

FIG. 26 a section through the linking device according to FIG. 24 along the line XXVI—XXVI.

FIG. 27 a section through the pipe according to FIG. 24 along the line XXVII—XXVII.

DETAILED DESCRIPTION OF EXEMPLARY EMBODIMENTS

Figure 6:
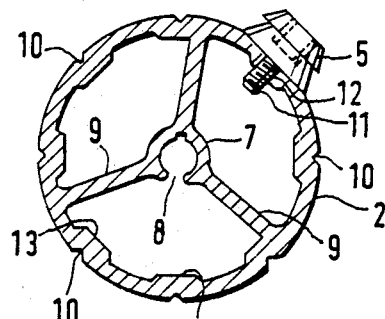
FIG. 6 a section along the line VI—VI of the pipe of the linking device according to FIG. 1, however with the connecting element of the clamping device inserted.
Figure 7:
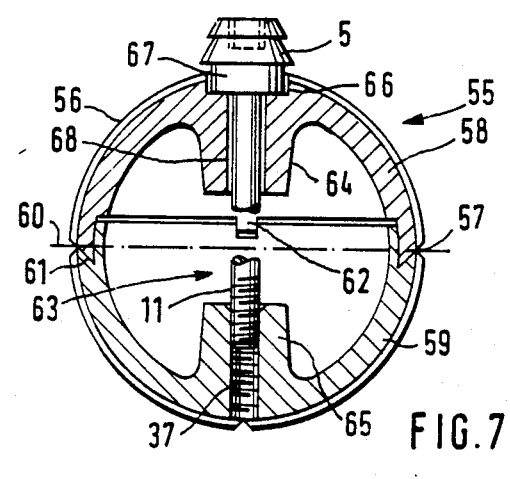
FIG. 7 a longitudinal section through the sphere according to FIG. 1, however turned by 180° and without the additional connecting element.

The linking device 1 for a frontal connection of a pipe 2 to a structural component 3 is comprised of the securing element 4, inserted into the pipe 2, of the connecting element 5, inserted into the structural component 3, and of the clamping device 6 which is in operative connection with the securing element 4 as well as with the connecting element 5. The pipe 2 has an axial longitudinally extending channel 7 having a continuing longitudinal slit 8. Three crosspieces 9. disposed inside the pipe 2 and offset by 120° to each other maintain the channel 7 in position. The pipe 2 is provided on its surface with longitudinal grooves 10, triangular in cross section and extending at an angle of 45° to each other. Threaded holes can be inserted into the longitudinal grooves 10 at those locations where pipe connections are desired on the pipe 2 and connecting elements 5 are then fixed in the threaded holes which are to be connected with the additional diverging pipes via the clamping device 6 and the securing elements 4. In FIG. 6 a connecting element 5 fastened on the pipe 2 is shown. The threaded pin 11 of the connecting element 5 engages the threaded bore 12 in the associated longitudinal groove 10. To give sufficient support to the threaded pin 11 of the connecting element 5, the inner wall of the pipe 2 has been supplied with a reinforcement 13 in the area of each longitudinal groove 10.

The securing element 4 is fixed to the front face of channel 7 of the pipe 2 by means of a threaded pin 14, which has a self-tapping thread. The free end of the securing element 4 is shaped as a circumferential locking projection 15, having a truncated cone-like cross section, and engages a correspondingly shaped circumferential groove 16 in the opposite inner sides 17, 18 of the clamping jaws 19, 20 of the clamping device 6. On its wide side the locking projection 15 has an obliquely extending undercut 21 which transitions into a plug zone 22 also having a truncated cone-like cross section. The undercut 21 engages the back of a corresponding step 23 of the groove 16, and the plug zone 22 a plug-in opening 24 in the insides 17, 18 of of the clamping jaws 19, 20, correspondingly formed with a truncated cone-like cross section and extending as far as the groove 16. The plug-in opening 24 transitions into a cup-shaped indentation 26 up to the plane of connection 25 of the clamping jaws 19, 20 at the front end of the pipe 2 in order to allow, if desired, the fixing at this location of the clamping device 6 of a sphere, which enters the indentation 26, instead of the pipe 2. The plug zone 22 of the securing element 4 axially transitions into a pin 27 extending as far as the plane of connection 25 of the clamping device 6, adjacent to the front side of which is the threaded pin 14, forming an annular shoulder 28 which abuts against the front end of the channel 7. In the side of the securing element 4 opposite the threaded pin 14 is located a hexagonal blind bore 29 to receive a corresponding wrench.

The free end of the connecting element 5 is formed analogous to the free end of the securing element 4. The connecting element 5 also has an annular locking projection 30, having a truncated cone-like cross section, which engages a correspondingly shaped annular groove 31 in the opposite inner sides 17, 18 of the clamping jaws 19, 20 of the clamping device 6. The locking projection 30 transitions on its wide side via an obliquely extending undercut 32 into a plug zone 33 having a truncated cone-like cross section. The undercut 32 engages the back of a corresponding step 34 of the annular groove 31, and the plug zone 33 a plug-in opening 35 in the insides 17, 18 of the clamping jaws 20, 21, correspondingly formed with a truncated cone-like cross section and extending as far as the groove 31. Located frontally adjacent to the plug zone 33 of the connecting element 5 is the threaded pin 11, forming an annular shoulder 36 adapted to the contours of the surface of the structural component 3, and is screwed into an associated threaded bore 37 in the structural component 3. In the side of the connecting element 5 opposite the threaded pin 11 is located a hexagonal blind bore 38 to receive a corresponding wrench. The clamping jaws 19, 20 of the clamping device 6 are connected by means of a screw connection 39 which extends through the conical area 40 of the clamping device 6. The front face of the truncated cone-shaped area 40 of the clamping device 6 abuts on the structural component 3, adapting itself to the contours of the surface of the structural component 3, while the front face of the cylindrical area 41 of the clamping device 6 abuts on the front face of the wall of the pipe 2. The screw connection 39 consists of an Allen screw 42 with associated nut 43. The clamping jaw 20 has an opening 44 to receive the head 45 of a screw 42 as well as a through-bore 46, correspondingly smaller in diameter, for the thread 47 of the screw 42. The other clamping jaw 19 has a corresponding through-bore 48 for the thread 47 of the screw 42 as well as a succeeding widened opening 49 to receive the nut 43. The nut 43 is fixed in its position by means of a corresponding shape of the opening 49. The clamping jaws 19, 20 are designed so that in the tightened state of the screw connection 39, i.e. with a tight connection between the structural component 3, the connecting element 5, the securing element 4 and the pipe 2, there is a narrow slit 50 between the facing inner sides 17, 18 of the clamping jaws 19, 20. To ease operation of the clamping device, when the screw connection 39 is loosened the clamping jaws 19, 20 are pushed apart correspondingly to the opening path of the screw connection 39 by two compression springs 51 inserted into the inner sides 17, 18 of the clamping jaws 19, 20 and because of this the clamping device 6 can be pushed in an easy manner over the connecting element 5 and the securing element 4 and at that time only the screw connection 39 need to be tightened. The compression springs 51 are inserted into respectively opposite blind bores 53 in the insides 17, 18 of the clamping jaws 19, 20 equidistant from the longitudinal axis 52 of the clamping device 6. Each clamping jaw 19, 20 has on its outside a longitudinal groove 54, triangular in cross section and extending at right angles to the slit 50.

Figure 1:
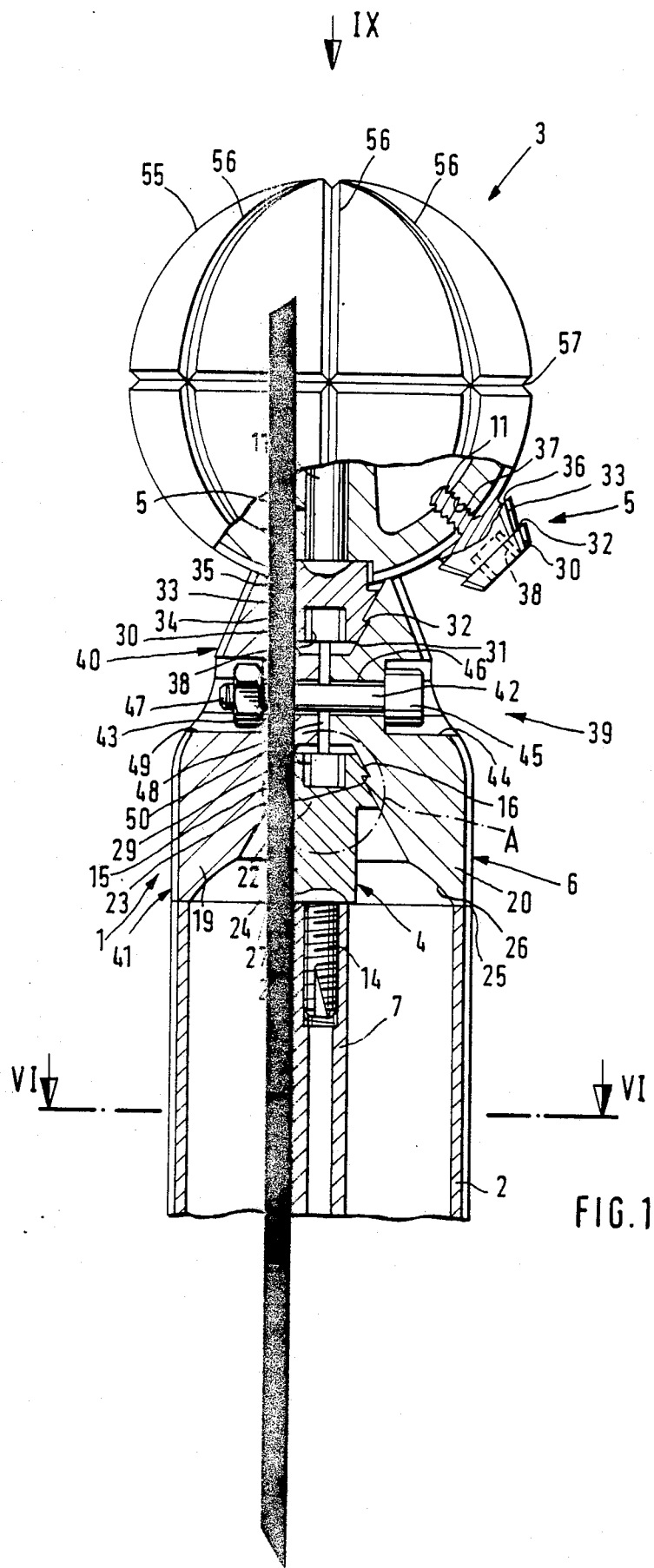
FIG. 1 a longitudinal section of a linking device according to the invention for the frontal connection of a pipe to a sphere.
Figure 2:
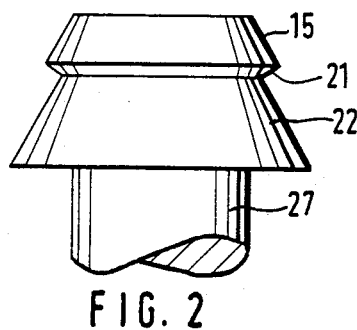
FIG. 2 an enlargement of the item "A" of FIG. 1.
Figure 3:
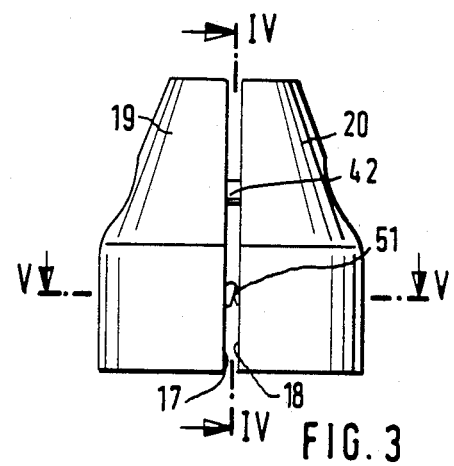
FIG. 3 an individual view of the clamping device of the linking device according to FIG. 1, however with additionally inserted pressure areas between the clamping jaws of the clamping device.
Figure 4:
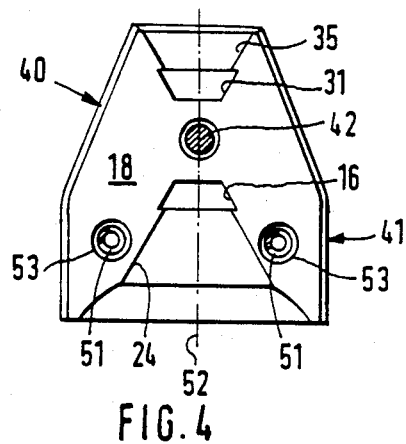
FIG. 4 a section along the line IV—IV of the clamping device according to FIG. 3.
Figure 5:
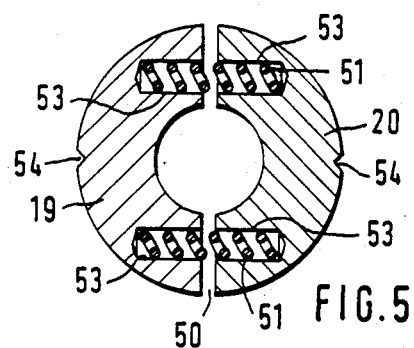
FIG. 5 a section along the line V—V of the clamping device according to FIG. 3.
Figure 9:
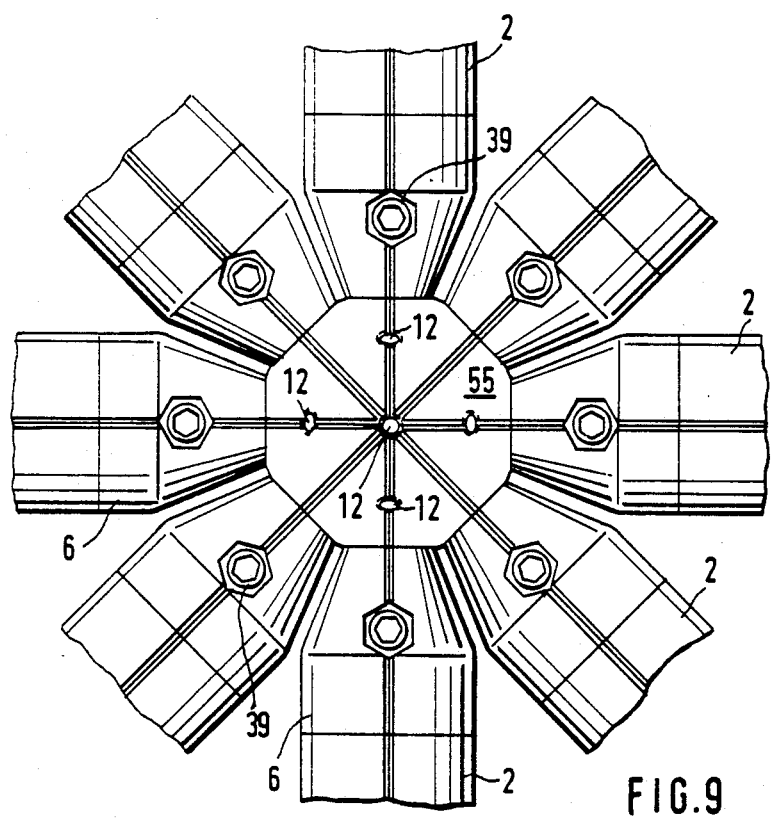
FIG. 9 a top view of the sphere according to FIG. 1 in the direction of the arrow IX, however with eight pipe branches fixed on the lateral groove of the sphere with the aid of linking devices and with further threaded bores for attaching linking devices with associated branch pipes.

In the exemplary embodiment shown in FIG. 1 the structural component 3 is a sphere 55. The sphere 55 has on its surface 8 longitudinal grooves 56 triangular in cross section and extending meridian-like, thus forming an angle of 45° to each other. Axially to the longitudinal grooves 56 the sphere surface has a circumferential lateral groove 57, also triangular in cross section which therefore extends on the equator of the sphere 55. At the locations were the connecting elements 5 branch off there are threaded bores 37 into the sphere 55 in the grooves 56, 57, into each of which the threaded pin 11 of the connecting element 5 is screwed. The connecting elements 5 are connected with the pipes 2 of the junction via clamping devices 6 and securing devices 4 (see FIG. 9).

Figure 8:
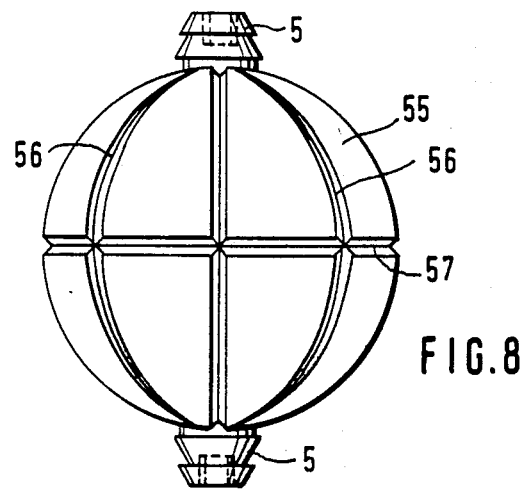
FIG. 8 a side view of the sphere according to FIG. 7 with additional connecting element.

The sphere 55 is hollow and put together from two hemispheres 58, 59. The line of separation 60 of the hemispheres 58, 59 extends axially through the lateral groove 57. The front sides of the hemispheres 58, 59 facing each other engage by means of a denticulation 61 cut into them. Furthermore a tongue and groove connection 62 is provided between the two hemispheres 58, 59. A screw 63, the head of which is designed as connecting element 5, serves to fasten the two hemispheres 58, 59. The hemispheres 58, 59 of the sphere 55 are provided in the zenith of the longitudinal grooves 56 in the interior with oppositely located pipe-like stubs 64, 65, the stub 64 of the hemisphere 58 having an axial opening 66 to receive a pin 67 of the connecting element 5 as well as a through-bore 68, correspondingly smaller in diameter, for the threaded pin 11 of the connecting element 5, and the stub 65 of the hemisphere 59 having a continuous threaded bore 37 to receive the threaded pin 11. After correct joining of the hemispheres 58, 59, provided by means of the denticulation 61 as well as the tongue and groove connection 62, the threaded pin 11 of the connecting element 5 must be screwed through the opening 66 and the through-bore 68 in the hemisphere 58 into the threaded bore 37 of the hemisphere 59 and tightened, by means of which a tight connection of the hemispheres 58, 59 is achieved. The linking devices 1 for the pipes 2 branching off in the desired directions can now be fastened on the sphere 55. A further connecting element 5 can be screwed from the outside into the continous threaded bore 37 of the hemisphere 59 (see FIG. 8).

Figure 10:
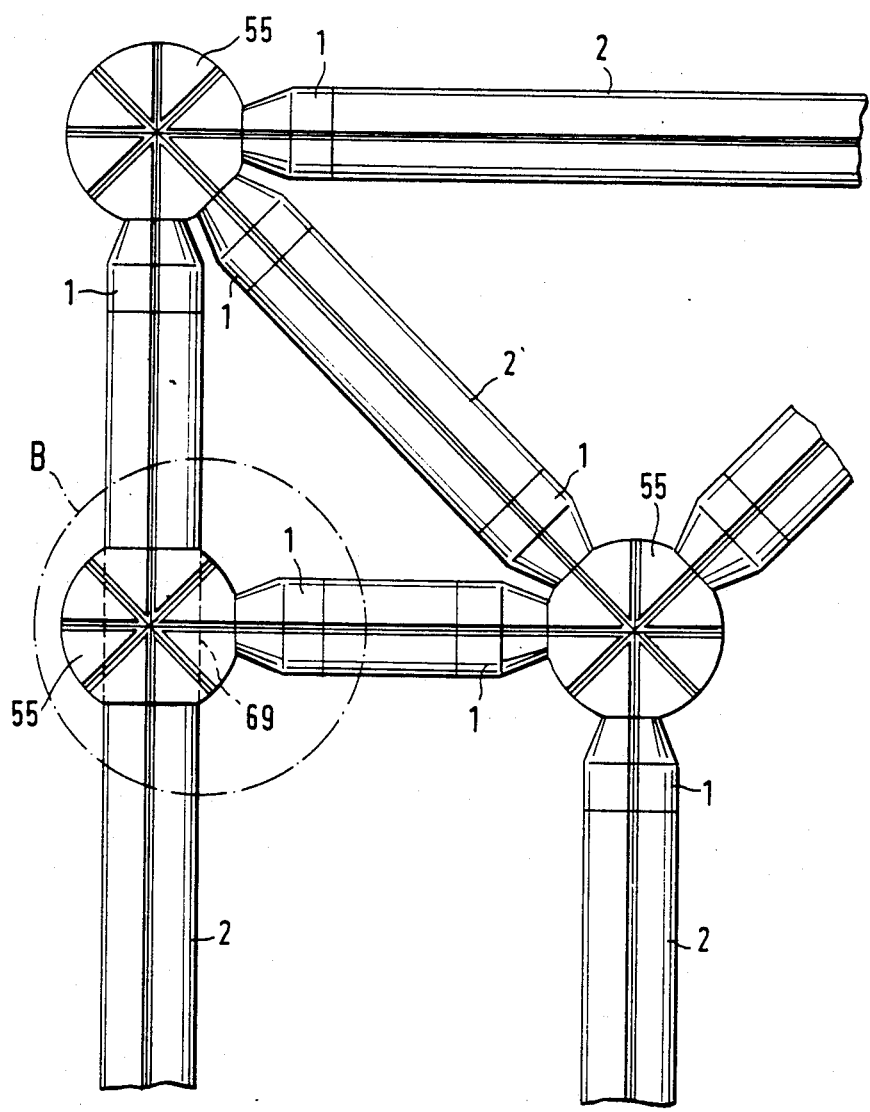
FIG. 10 a section of a pipe grid made with the aid of the linking devices according to the invention.

In the section of a pipe grid made of spheres 55, linking elements 1 and pipes 2, shown in FIG. 10, a sphere 55 of a solid material with a large bore 69 is used, where a continuous pipe 2 is drawn through the bore 69. The frontal connection of a pipe 2 to this sphere takes place in an analog manner to the hollow sphere 55 shown in FIG. 1 (see FIG. 11).

In the exemplary embodiment shown in FIGS. 12 and 13 the structural component 3 is a pipe bracket 70 surrounding the pipe 2. The clamping shanks 72, 73, which leave a slit 71 open between them, are designed as connecting element 5 which is connected with the pipe 2 via the clamping device 6 with associated screw connection 39 and the securing element 4. In the loosened state of the screw connection 39 the pipe 2 can be turned by 360°. The pipe bracket 70 has on its side opposite the clamping shanks 72, 73 a further connecting element 5 which is provided with an axial slit 74 in order to create a spring effect. Of course, if required, additional connecting elements 5 can be disposed on the pipe bracket 70. In this manner a plurality of branch pipes can be fastened in the same plane to a continuous pipe 2 in a simple way.

In the exemplary embodiment shown in FIGS. 14 to 16 the sphere 55 is connected to a wall 76 via a clamping device 6 in the form of a 90° elbow 75, the clamping jaws 19, 20 of which are connected with each other via a screw connection 39. In this case the connecting elements 5 engaging corresponding recesses of the clamping device 6 are provided with an axial through-bore 77, which is widened into a screw head receiver 78 in the area of the locking projection 15. The connecting elements 5 are fastened to the wall 76 and the sphere 55 by means of corresponding screws 79. The clamping jaws 19, 20, having corresponding recesses, are locked by means of the screw connections 39 to these connecting elements 5, the clamping jaws 19, 20 being fixed in their position relative to each other via tongue and groove guides 80.

Figure 19:
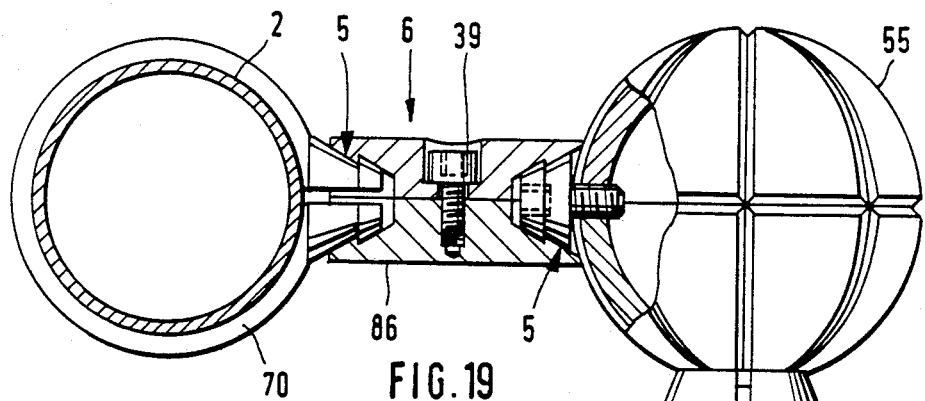
FIG. 19 an alternate embodiment of the view according to FIG. 17.

In the exemplary embodiment shown in FIGS. 17 and 18, one of the clamping devices 6 is designed as a straight, divided pipe section 81 with a cavity 82, in which the clamping jaws 19, 20 are coupled with each other by screw connections 39. The clamping device 6 in the form of a straight pipe section 81 is connected at its one end via a connecting element 5, formed as a body 84 mirror-symmetrical to its lateral axis 83 with exterior locking projections 15 and interior plug zones 22, with the sphere 55, the hemispheres 58, 59 of which have correspondingly shaped areas 85. The exemplary embodiment according to FIG. 19 shows a clamping device 6 designed as a straight, divided rod 86 having an axial screw connection 39. The pipe grid shown in FIG. 20 illustrates further embodiments of the clamping device 6 in the form of a divided T-shaped pipe section 87 with three screw connections 39, as a divided Y-shaped pipe section 88 with three screw connections 39, as a divided angled branch pipe section 89 with three screw connections 39 or as a divided cruciform pipe section 90 with four screw connections 39.

Figure 22:
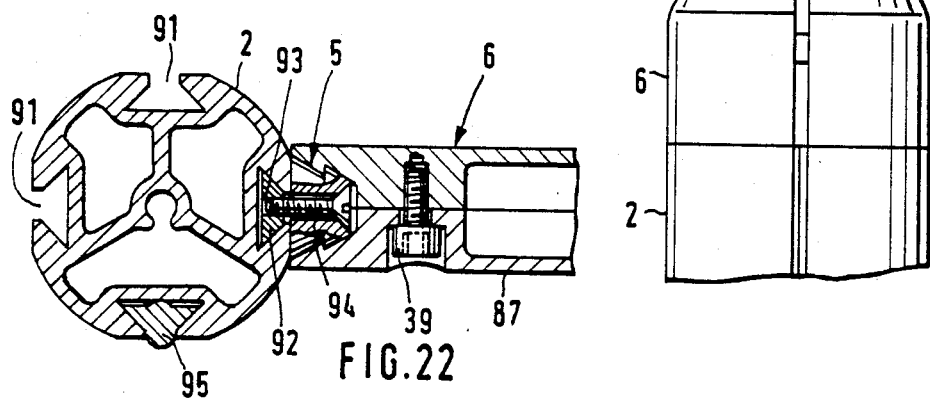
FIG. 22 a section through the pipe grid according to FIG. 21 along the line XXII—XXII.
Figure 23:
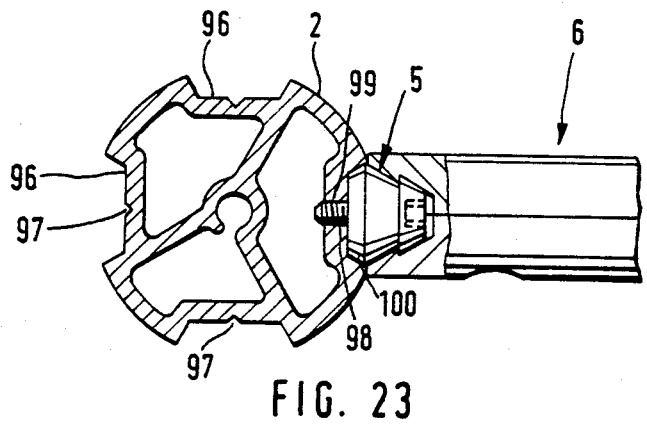
FIG. 23 an alternate embodiment of the view according to FIG. 22.

In the pipe grid shown in FIG. 21 the pipe 2 in the form of a standpipe has on its exterior several swallowtail-shaped longitudinal grooves 91 evenly distributed over the circumference into which corresponding tenon blocks 92 can be glidingly inserted from the front. Each tenon block 92 has a threaded bore 93 into which can be screwed a screw 94 of the connecting element 5. In this way the connecting element 5 can be fastened at any desired height on the pipe 2. A clamping device 6 then can be attached to the connecting element 5 in the manner previously described. The open spaces of the longitudinal grooves 91 are filled by blind bars 95. In the alternate embodiment to FIG. 22 shown in FIG. 23, the pipe 2 in the form of a standpipe is provided on its outside with longitudinal grooves 96 evenly distributed over the circumference and extending conically to the outside. In the center of the bottom of each longitudinal groove 96 a small longitudinal slit 97 is inserted which serves to make the application of a threaded bore 98 at a desired location within the longitudinal groove 96 easier. The threaded pin 99 of a connecting element 5, having an extension 100 engaging the longitudinal groove 96, engages the threaded bore 98. A clamping device 6 is connecting to this connecting element 5.

Figure 28:
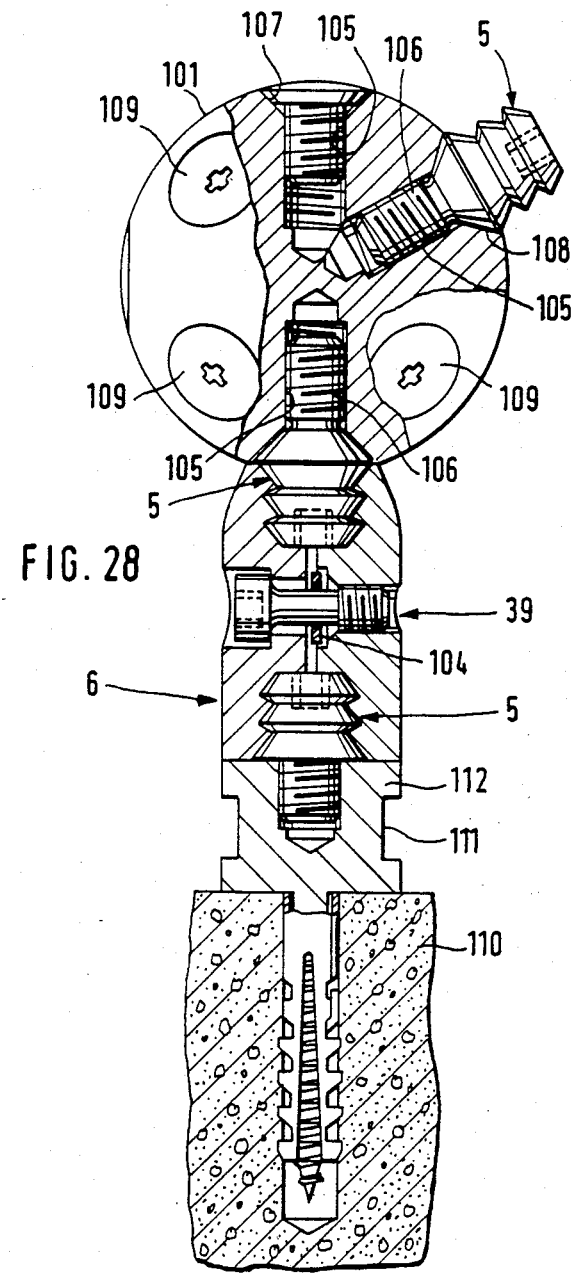
FIG. 28 a section through a straight connection between a sphere and a wall with the aid of a linking device according to the invention.

In the exemplary embodiment of the connection between a pipe 2 and a sphere 101 serving as structural component 3, shown in FIGS. 24 to 27, two clamping devices 6 coupled with each other are used. The connecting elements 5 and the securing element 4 each have two locking projections 15 placed above one another with which are associated corresponding recesses 102 in the clamping jaws 19, 20 of the clamping devices 6. Each screw 103 of the screw connections 39 of the clamping devices 6 is secured against falling out of the associated clamping jaw 20 by means of a safety washer 104. The sphere 101 made of a solid material is provided on the outside with threaded bores 105 evenly distributed over the surface which serve to retain corresponding connecting elements 5 provided with threaded pins 106. Each threaded bore 105 transitions towards the outside into a non-threaded conical widening 107 for receiving a corresponding extension 108 on these connecting elements 5. The threaded bores 105 of the sphere 101 not occupied by connecting elements 5 are closed by blind plugs 109 adapted to the surface of the sphere 101. Furthermore, in this exemplary embodiment the pipe 2 is provided with a channel 7 closed in itself. The exemplary embodiment shown in FIG. 28 illustrates the connection of a sphere 101 to a wall 110 with the interposition of a clamping device 6 and of a supporting element 112, provided with a point 111 for applying a wrench and screwed into the wall 110. The connecting element 5 is screwed into the supporting element 112 and is connected via the clamping device 6 with the connecting element 5 fastened on the sphere 101.

Figure 29:
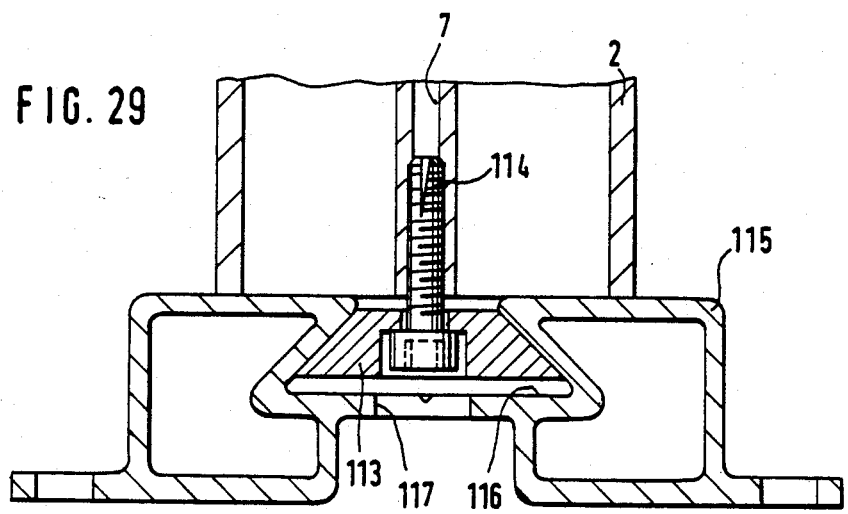
FIG. 29 a section to a frontal connection of a pipe to a hollow section.
Figure 30:
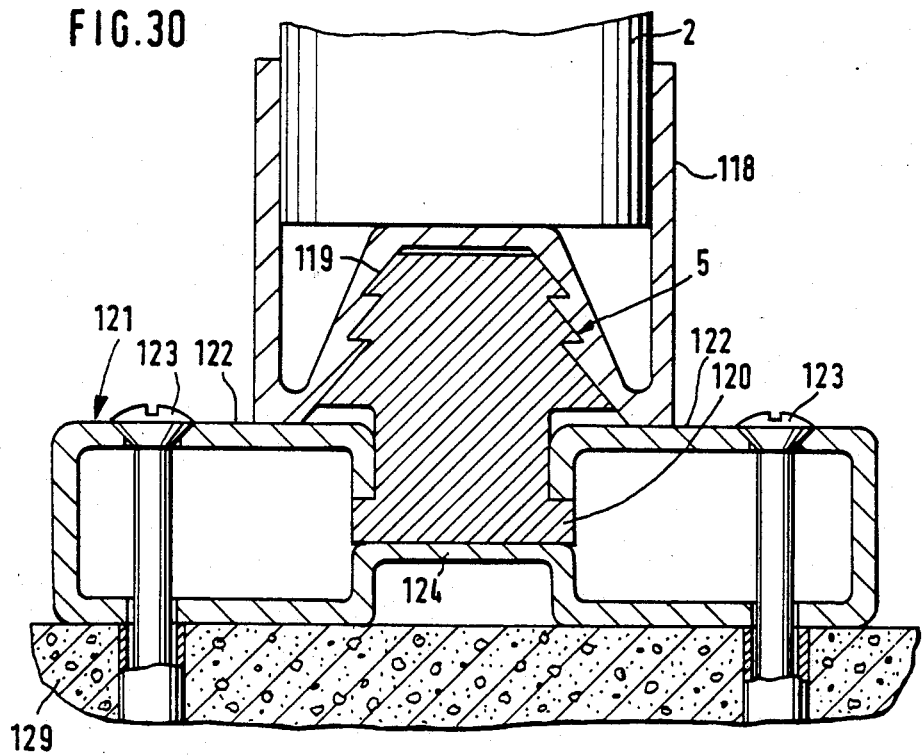
FIG. 30 an alternate embodiment of the view according to FIG. 29.

For a variable floor connection of the pipe 2 serving as a standpipe, the pipe is fixed via a screw 114, inserted into the tenon block 113 and screwed into the channel 7 of the pipe 2 to a longitudinal hollow section 115 having a swallowtail-shaped longitudinal groove 116. Before installing the pipe 2, a through-bore 117 is made at the desired location in the bottom of the longitudinal groove 116 to insure access to the screw 114. In the alternate embodiment shown in FIG. 30 to the embodiment of FIG. 29, a connecting element 118, in the bottom of which a recess 119 for receiving the connecting element 5 is placed, is screwed into the end of the pipe 2. The connecting element 5 has a T-shaped foot 120 which is fastened in a hollow section 121 frontally abutting the connecting element 118. Because of the screw connection 123 of the hollow section 121 with the bottom 129, the free ends of the legs 122 of the hollow section 121 press on the T-shaped foot 120 of the connecting element 5 seated on a bulge 124 of the hollow section 121.

Figure 31:
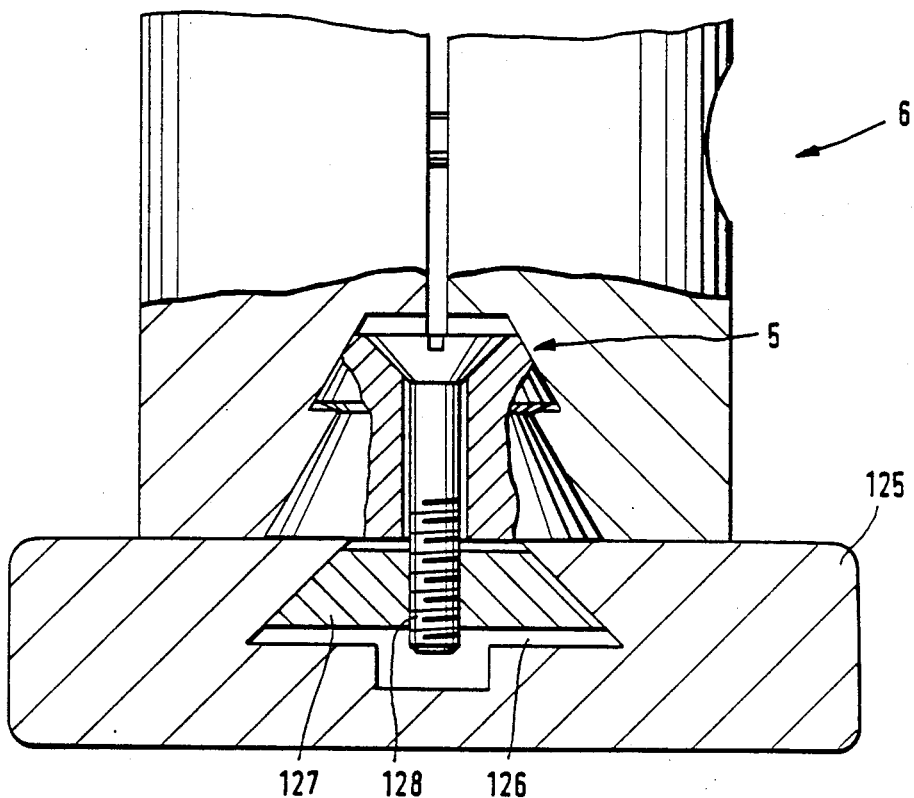
FIG. 31 a section through the lower part of the connection to a plate of a clamping device supporting a pipe.

In the exemplary embodiment shown in FIG. 31 a clamping device 6, carrying the pipe 2 on one of its ends (not shown), is connected at its other end via a connecting element 5 with a plate 125 having a swallowtail-shaped groove 126 with a tenon block 127 inserted therein. The tenon block 127 is fastened at the desired position in the groove 126 via a screw connection 128 on the connecting element 5.

The above description of the drawings has illustrated in its details the particularly simple and easy to operate construction of the linking device according to the invention, which despite its simplicity has proven to be extremely reliable. Although the invention has only been described by means of a few exemplary embodiments, obvious variations of the invention which can be seen from this description will be obvious for one skilled in the art within the scope of the claimed linking device.

I claim:

1. A linking device for connecting a pipe to a structural component, to form a junction point, comprising:
    a securing element attached to said pipe and having a free end,
    a connecting element attached to said structural component and having a free end, and
    a single clamping device abutting with its ends on the pipe and on said structural component, said clamping device including two opposed clamping jaws which simultaneously engage said free ends of said securing element and said connecting element, thereby linking said pipe and said structural element, said jaws held together by a screw connection.

2. A linking device in accordance with claim 1, wherein the respective free ends of the securing element (4) and the connecting element (5) are each provided with an annular locking projection (15, 20), in that each locking projection (15, 30) engages a correspondingly formed annular groove (16, 31) in the opposed inner sides (17, 18) of the clamping jaws (19, 20) of the clamping device (6), and in that the clamping jaws (18, 19) of the clamping device (6) can be locked with the securing element (4) and the connecting element (5) by means of the screw connection (39).

3. A linking device in accordance with claim 2, characterized in that the locking projections (15, 30) are truncated cone-like in cross section and are provided at their wide side with an undercut (21, 32) which engages the back of a corresponding step (23, 34) of the associated annular groove (16, 31) in the clamping jaws (19, 20) of the clamping device (6).

4. A linking device in accordance with claim 3, characterized in that the wider portions of the truncated cone-like locking projections of the securing element and the connecting element are oriented toward said pipe and said structural component respectively, wherein corresponding plug-in openings, shaped in cross section as complementary truncated cones and extending as far as the associated groove, are embedded in the inner sides of the clamping jaws of the clamping device.

5. A linking device in accordance with claim 1, characterized in that the structural component (3) is formed as a pipe bracket (70) surrounding a continuous pipe (2), clamping shanks (72, 73) of which comprising said connecting element (5) and can be locked via the screw connection (39) of the clamping device (6).

6. A linking device in accordance with claim 1, characterized in that the clamping device is embodied as a 90° elbow with two screw connections.

7. A linking device in accordance with claim 1, characterized in that the connecting element 5 is embodied as a body mirror-symmetrical to its lateral axis with exterior locking projections and interior plug zones with which are associated with correspondingly shaped elements in the clamping device and the structural component respectively.

8. A linking device in accordance with claim 1, characterized in that the pipe is provided on its exterior with several dovetail-shaped longitudinal grooves evenly distributed over the circumference into which corresponding tenon blocks having a threaded bore can be glidingly inserted, and in that each tenon block can be fastened to said pipe by means of a screw engaging its threaded bore and part of said connecting element.

9. A linking device in accordance with claim 1, characterized in that the connecting element is provided with a plurality of locking projections arranged adjacent one another and with which are associated corresponding recesses in the clamping jaws of the clamping device.

10. A linking device in accordance with claim 1, characterized in that the structural component is made of a solid material and is provided on its outside with threaded bores, evenly distributed over the surface, for the attachment of connecting elements.

11. A linking device in accordance with claim 1, characterized in that the securing element is provided with a plurality of locking projections arranged adjacent one another and with which are associated corresponding recesses in the clamping jaws of the clamping device.

12. A linking device according to claim 1, characterized in that the clamping device is embodied as a straight pipe section with two screw connections.

13. A linking device according to claim 1, characterized in that the clamping device is embodied as a straight rod section with one screw connection.

14. A linking device according to claim 1, characterized in that the clamping device is embodied as a T-shaped pipe section with three screw connections.

15. A linking device according to claim 1, characterized in that the clamping device is embodied as, a Y-shaped pipe section with three screw connections.

16. A linking device according to claim 1, characterized in that the clamping device is embodied as, an angled branch pipe section with three screw connections.

17. A linking device according to claim 1, characterized in that the clamping device is embodied as a cruciform pipe section with four screw connections.

18. A linking device for connecting first and second structural elements, comprising;
    a first securing element having a free end with a circumferential locking projection and configured for connection to said first structural element so that said free end extends from said first structural element,
    a second securing element having a free end with a circumferential locking projection and configured for connection to said second structural element so that said free end extends from said second structural element, and
    a single clamping means having first and second jaws configured for simultaneously surrounding said free ends of said securing elements, and having internal recesses for engaging said circumferential locking projections to maintain said structural elements in a fixed relationship thereby linking said first and second structural elements.

19. A linking device according to claim 18, wherein; said free ends of said first and second securing elements are of truncated conical configuration.

20. A linking device according to claim 18, wherein; a single retaining means is utilized to secure said clamping means about said first and second securing elements.

* * * * *